United States Patent [19]
Hale

[11] Patent Number: 5,540,132
[45] Date of Patent: Jul. 30, 1996

[54] METHOD AND APPARATUS FOR TEACHING MUSICAL NOTATION TO YOUNG CHILDREN

[76] Inventor: Beverly M. Hale, 2332 Franklin, Bellingham, Wash. 98225

[21] Appl. No.: 260,777

[22] Filed: Jun. 16, 1994

[51] Int. Cl.⁶ .................................................. G09B 15/00
[52] U.S. Cl. ........................................ 84/470 R; 434/428
[58] Field of Search ............................ 84/470 R, 471 R, 84/476; 273/236; 434/428, 430, 433

[56] References Cited

U.S. PATENT DOCUMENTS

| 2,236,638 | 4/1941 | Adams | 84/476 |
| 2,315,793 | 4/1943 | Jay | 84/476 |
| 2,447,213 | 8/1948 | Sledge | 84/470 |
| 2,807,183 | 9/1957 | Ney | 84/471 |
| 3,994,500 | 11/1976 | Schow | 84/470 X |
| 4,819,539 | 4/1989 | Searing | 84/476 |

Primary Examiner—Patrick J. Stanzione
Attorney, Agent, or Firm—Todd N. Hathaway

[57] ABSTRACT

A method for teaching musical notation to children. Each note is associated with a distinctly identifiable color, which is in turn associated with an object which naturally occurs in this color. Each object, in turn, is associated with a cartoon character which prominently incorporates an image of the object. Each character is endowed with a distinctly identifiable personality characteristic which enables the child to utilize the cartoon character in an educational activity. These relationships allow the child to apply relatively sophisticated symbolization techniques which are a part of the child's natural developmental process in order to master the musical notation system.

14 Claims, 4 Drawing Sheets

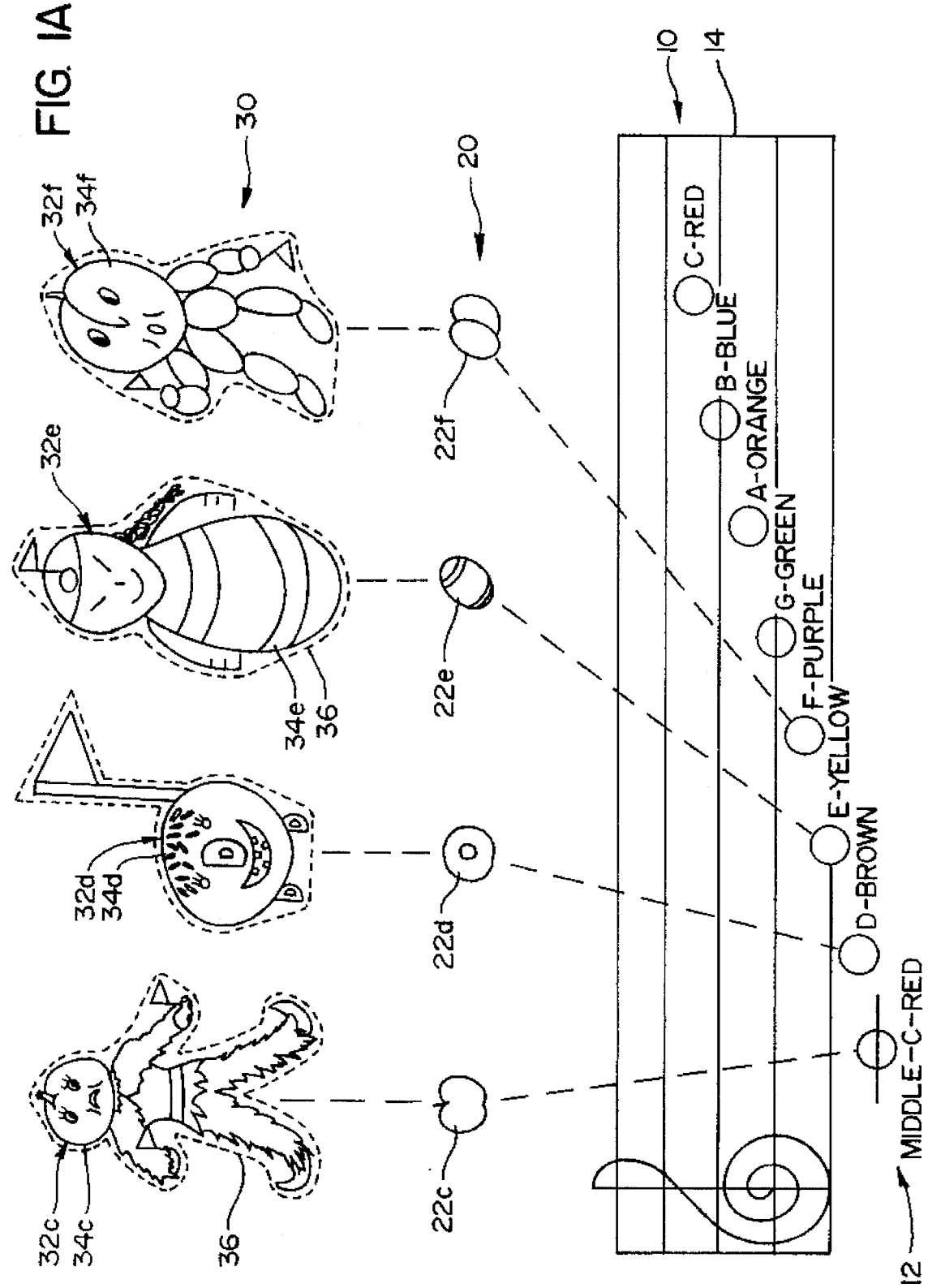

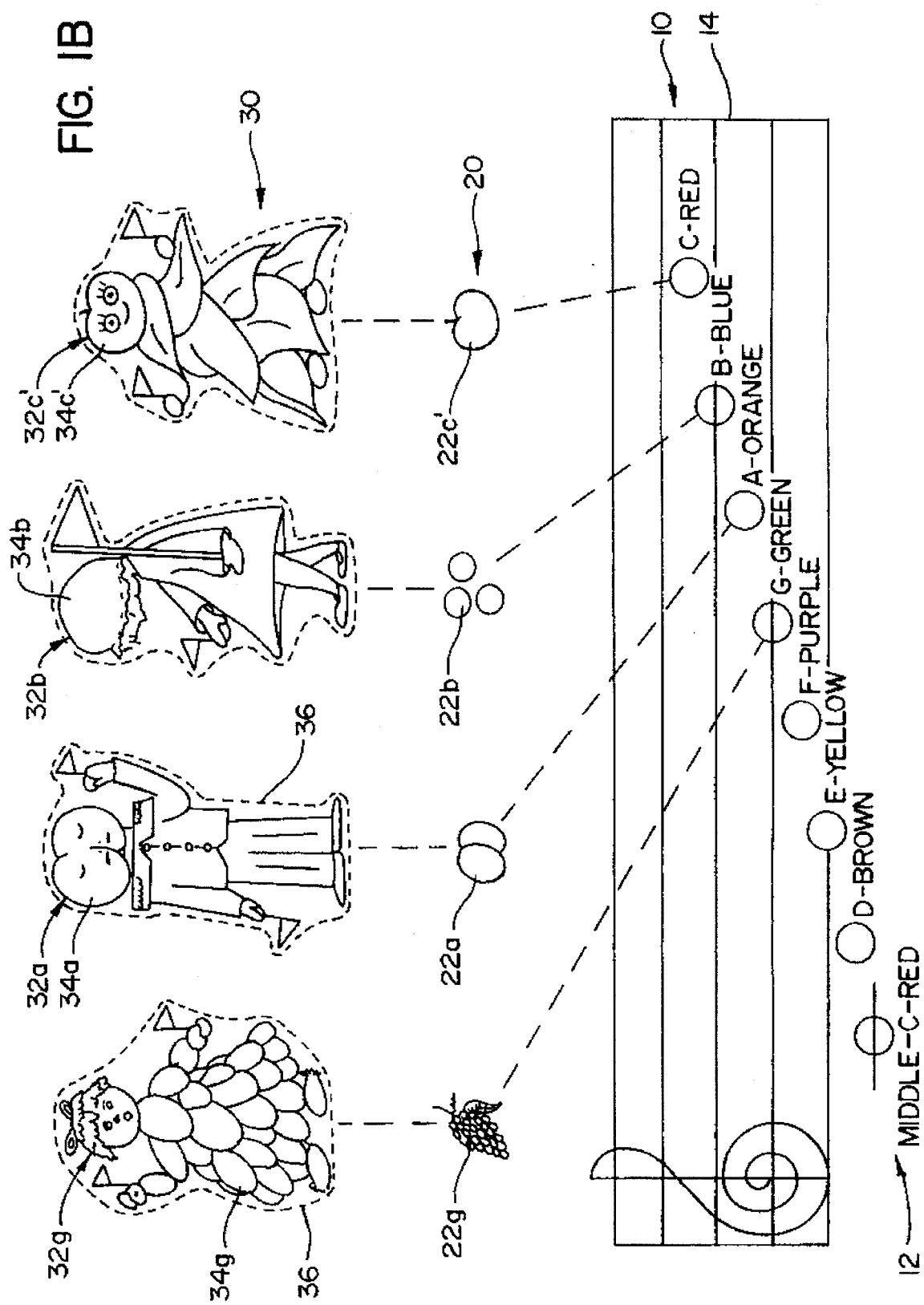

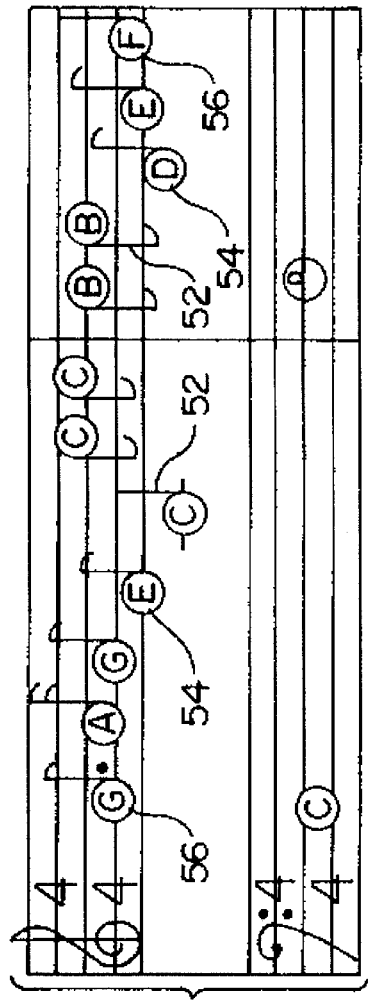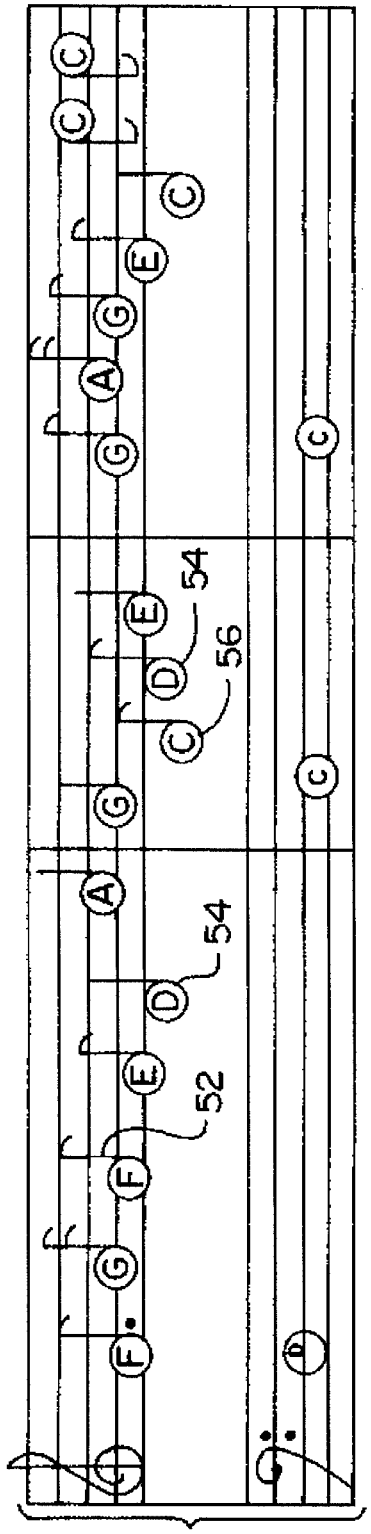
FIG. 3

METHOD AND APPARATUS FOR TEACHING MUSICAL NOTATION TO YOUNG CHILDREN

BACKGROUND OF THE INVENTION

1. Field of the Invention

The present invention relates to the educational tools and display apparatus, and more particularly, to a system for teaching musical notation and auditory perception to young children, by providing a system of symbols endowed with distinctive characteristics which the child can associate individually with each of the musical notes.

2. Background

Many systems and aids have been proposed for teaching the musical scale to young children. A number of these systems have utilized colors and/or colored objects, while others have taken the form of card games. Illustrative examples of earlier approaches include those set forth in the following U.S. patents:

U.S. Pat. No. 4,819,539 (Searing) discloses a system which employs display cases having horizontal dividers which represent the lines on a staff. The cases hold flash cards showing objects having names which begin with letters which correspond with the positions on the scale, i.e., a flash card showing a pair of gloves is provided for the note "G". A cassette tape device generates the noun, the name of the note, and then the sound of the note, after which the student selects another card; the time required to remove all of the cards is clocked by the device.

U.S. Pat. No. 2,807,183 (Ney) discloses a portable dummy keyboard having a frame 56 which displays the musical staves above the keyboard. The frame supports wires on which colored markers representing each of the keys can be mounted.

U.S. Pat. No. 2,447,213 (Sledge) discloses a color code system in which each of the lines on a staff is provided with its own color, i.e. the "G" line is colored blue, and a small blue house is mounted at the end of the line, drawing the analogy to a street. Markers in the shape of animals having names which begin witch the appropriate letters (i.e., a goose for "G", a bear for the note "B", and so forth) are mountable on the display board and are colored to match the appropriate note line. For example, the goose is colored blue (and is also marked with the letter "G"), and the child is taught that the goose lives in the blue house at the end of the blue street. After the child learns the line with which each note is associated, the colored house for that line is moved to the appropriate key on a dummy piano keyboard made up of blocks 12.

U.S. Pat. No. 2,236,638 (Adams) discloses a device comprising a series of interfitting dummy key blocks which are identical in shape to the keys of a piano, but which are organized according to a color arrangement.

U.S. Pat. No. 2,315,793 (Jay) discloses a system which is somewhat similar to that of Sledge, in that each note has associated therewith the image of an animal whose name begins with the letter which represents that note; i.e., a picture of the head of a goat appears with the note "G" on the printed musical score, along with the letter "G" itself. This same symbol is also displayed on the sides of a hollow toy block which houses swinging chimes which emit the sound of the appropriate note when the block is shaken.

The prior art systems described above all employ some form of symbology, by associating colors and/or images with the notes of the musical scale. However, some of these systems (e.g. Searing) are overly complex for use by very young children, while others (e.g. Adams, Ney, and Sledge) are particularly adapted to teaching the use of a piano keyboard, which may or may not be the object of instructing the child.

More fundamentally, none of these earlier systems makes full use of the capabilities which symbolization offers in education of young children. Recently, it has come to be understood that children employ symbology in changing and increasingly complex patterns very early in life. It is now believed that, beginning at about the age of two, children pass through a series of developmental crests that have been termed "waves". As the child enters each wave, the use of symbolization becomes increasingly sophisticated. In particular, as children approach the more advanced stages of symbolization (around three to five years of age), they commonly show an attraction toward what has been referred to as "second-order" symbolization, in other words, a set of symbols or marks that itself refers to a first set of symbols or marks. It is believed that the impulse to create second-order symbol systems is a deep-seated human inclination which emerges with little provocation. The systems described above generally employ symbology in only the most basic forms, and thus do not take advantage of the powerful, higher-order levels of symbolization towards which children in this age group are naturally inclined.

Moreover, the development of "second-order" symbolization skills is valuable in and of itself. Once the child has devised a symbol system that itself refers to other symbol systems, the possibility of embeddedness emerges; complete systems can be systematically absorbed as component parts into ever more powerful systems, as, for example, when multiplication presumes addition, or when algebra presumes arithmetic. Such high-order systems of notation lie at the very center of many scholastic activities, and the capacity to engage readily in such activities is key to the academic success of a child. As will be described below, the present invention not only takes advantage of higher-order symbolization to achieve the immediate goal of instructing the child regarding the notes of the musical scale, but it fosters the early and continued development of such symbolization for the more general benefit of the child.

The preceding section has discussed the importance of higher-order symbolization in general. With respect the present invention, there are additional reasons for exercising the musical abilities of a child by employing a symbolization process. Firstly, it is now believed that what is generally referred to as human intelligence is actually made up of a plurality of distinct but interrelated "intelligences", each of which appears to be somewhat localized in separate regions of the brain, and each of which is susceptible to capture in a symbolic system. In particular, some specialists have theorized that there are at least seven identifiable "intelligences", namely (i) use of the body to solve problems or to make things, (ii) an understanding of other individuals, (iii) an understanding of ourselves, (iv) language, (v) logical-mathematical analysis, (vi) spatial representation, and (with respect to the present invention in particular) (vii) musical thinking (e.g., see *The Unschooled Mind,* Howard Gardner, Basic Books, Inc. (1991); *Frames of Mind, the Theory of Multiple Intelligences,* Howard Gardner, Basic Books, Inc. (1983)).

Although the first sin "intelligences" listed above are reasonably well addressed by conventional education programs, there is relatively little emphasis on musical thinking, with the result that this particular intelligence tends to be widely undeveloped in modern Western society. In a broader context, musical intelligence is one of those intelligences which make up what is commonly referred to (from it location) as "right brain" thought; it has become recognized that, although traditional academic programs stress the development of "left brain" skills, it is in fact critical for both types of thought to become fully developed if the individual is to achieve their full potential.

Moreover, it is believed that, amongst all of the identifiable "intelligences", musical thinking is one of the first to be enabled in the development of a child (see references cited above). Therefore, to the extent that this particular intelligence is successfully developed as early as possible, the symbolization and other skills which the child thus acquires enable the other intelligences to be developed at an accelerated rate.

Therefore, there exists a need for a system for teaching musical notes and tones to young children which employs and takes full advantage of the natural ability and tendency of such children to engage in relatively high-order symbolization. Furthermore, there is a need for such a system which develops the child's musical ability or "intelligence" at a relatively early age, so as to enable the child to retain and utilize this ability in related developmental areas.

SUMMARY OF THE INVENTION

The present invention has solved the problems cited above. Broadly, this is a method for teaching musical notation to children which comprises the steps of: (a) associating each musical note with a distinctly identifiable color, (b) associating each distinctly identifiable color with an object which is within the child's experience and has a natural color which matches the distinctly identifiable color, and (c) associating each colored object with a cartoon character by forming the character so as to prominently incorporate an image of the object.

Preferably, the method may comprise the step of endowing each of the characters with a distinctly identifiable personality characteristic. The step of associating each color with an object may also comprise the step of associating each color with an object which has a noun name which begins with the letter which is the same as the letter designation of the note with which the color is associated. The step of associating each object with a cartoon character, in turn, comprises the step of associating each object with a cartoon character having a name which begins with the letter which is the same as the letter which begins the noun name of the object and the letter designation of the musical note.

The step of associating the object with the cartoon character may further comprise forming of the character as a puppet for manual operation by the child. In this case, the method may further comprise the step of employing the manually operable puppet in a storytelling or musical activity which involves the cartoon character.

The step of forming the cartoon character may further comprise the step of providing the puppet with a tonal device which is configured for selective actuation by the child to be employed in the storytelling activity.

The step of associating each color with an object which is within the child's experience may further comprise the step of providing a set of objects which, in common, stimulate at least a selected one of the child's senses, each distinct object providing the child with a stimulus which is distinctly identifiable in character. The step may comprise providing a set of edible objects within the child's experience which each stimulate the child's sense of taste. Depending on the set of objects which is selected, one or more of the child's other senses can also be employed in forming this association.

BRIEF DESCRIPTION OF THE DRAWINGS

FIG. 1A is a diagrammatical view illustrating the sequential stages of symbolization which are employed by the present invention, first linking a musical note alphabetically and by color to one of a particular series of objects which are in the child's realm of experience, and then alphabetically and by color and shape, and optionally by tone, to a cartoon character which embodies selected personality characteristics which the child is able to employ in high-level symbolization such as storytelling;

FIG. 1B is a diagrammatical view similar to FIG. 1A showing exemplary objects and cartoon characters which are associated with the next four notes in the diatonic scale;

FIG. 3 is a diagrammatical view of a portion of a musical score showing the manner in which a color code legend is associated with the score and the notes are formed so that the child can color these in with appropriate colors selected from the legend.

DETAILED DESCRIPTION a. Overview

Figure 2:
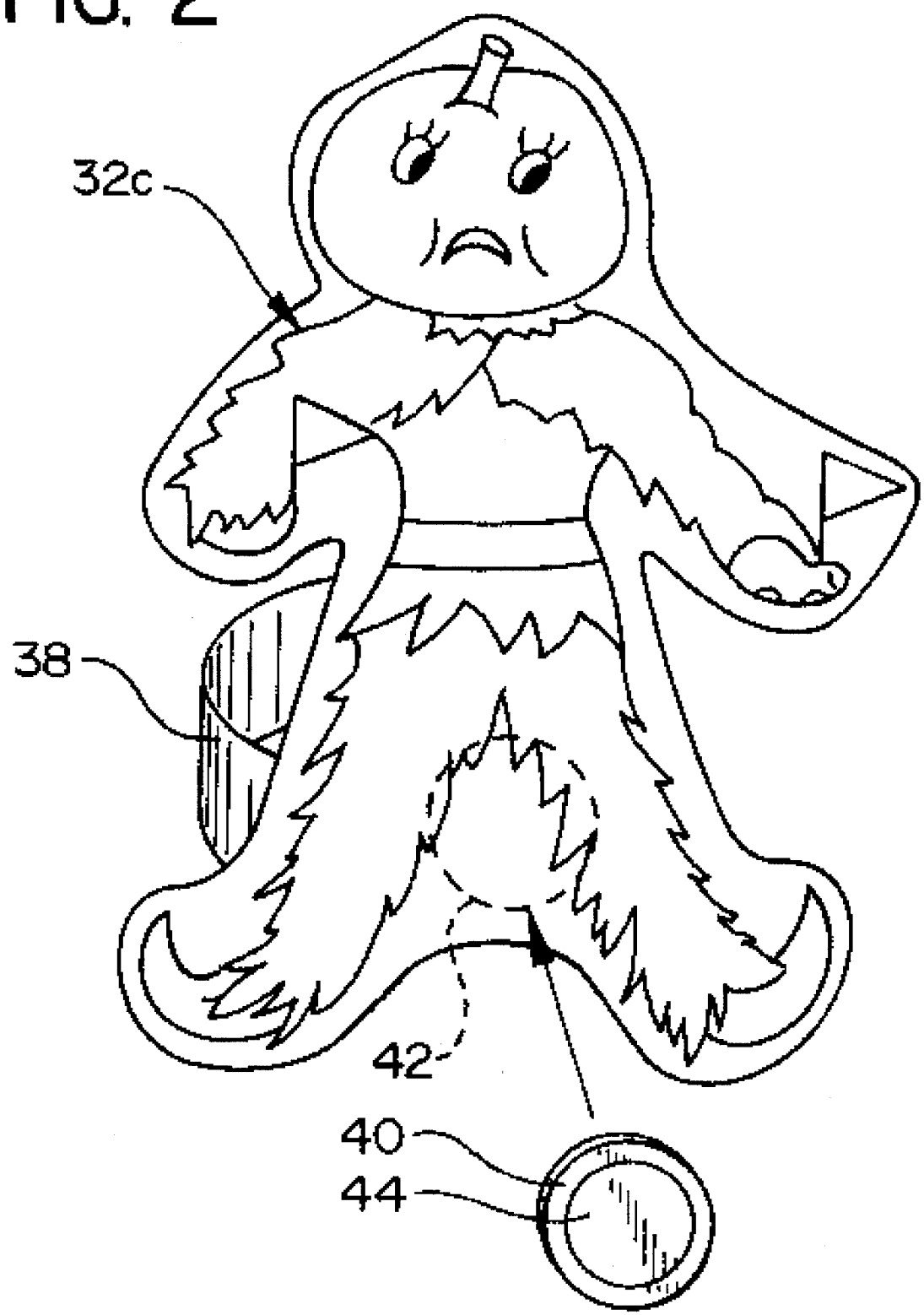
FIG. 2 is a prospective view of a finger puppet embodying one of the cartoon characters of FIGS. 1A–1B which are associated with individual notes, so that the child can employ the puppet in storytelling, puppet shows, and similar activities, the puppet optionally being provided with an electronic device for emitting a tone such as middle-C, which can be activated by pressure between the child's fingers.

The present invention facilitates the instruction of musical notation to young children by creating a system which employs the second-order symbolization which is a natural part of the child's development. In short, the system of second-order symbolization uses symbols or notations that themselves refer to other symbols, in this case the notes of the musical scale and other music symbols.

In particular, the system of symbolization which is employed by the present invention involves the following steps or stages:

(1) A separate and distinct color is associated with each note of the scale.

(2) Each note is then associated with one of the selected series of objects which is within the realm of the child's experience, on the basis of
   (a) the natural color of the object, and
   (b) the first letter of the noun name.

The series is preferably selected on the basis of a shared sensory stimulus by which the objects are ordinarily perceived and characterized by the child; i.e., taste, smell, touch, and so forth.

(3) Each inanimate object representing a note of the musical scale is then associated with a cartoon character by
   (a) color,
   (b) the first letter of the name, and
   (c) shape.

Using facial characteristics, name structure and other features, each cartoon character is endowed with distinctive personality traits which distinguish it from the others in the series.

(4) Each cartoon character is provided in a form which the child and/or teacher can manipulate manually so as to encourage educational instruction, storytelling, puppet plays, individual play, and so forth, so that the symbolization is fully realized.

(5) Optionally, each manually operable character may be provided with a device for emitting a tone, sentence or song, in a tone which corresponds to that of the note which the character represents, thereby reinforcing the association with that note and also improving the child's auditory discrimination.

Accordingly, the present invention provides a highly effective system for teaching musical notation to very young children, in a manner which is developmentally appropriate at this stage of their life. In a larger sense, however, the present invention provides a tool which parents and teachers can use to fill an existing gap in the socialization of children, by motivating and stimulating their interest in music from infancy through pre-school and elementary school. The system of the present invention is particularly well adapted to use in conjunction with a "learning center" approach to education, in which there is an activity area having various educational tools which the children can use for self-instruction on a periodic basis.

b. Exemplary embodiments

FIGS. 1A–1B illustrate a system in accordance with the present invention in which the basis for the primary symbolization is provided by a series of fruit and other relatively compact edible objects which are both familiar to and readily distinguishable by the child, on the basis of both color and taste.

Accordingly, a first symbolization level, as represented at 10 in FIG. 1A, involves associating the notes of the scale with individual, easily distinguished colors. The child is thus presented with the series of notes 12 located in the conventional positions on a simplified musical staff 14. The notes are preferably printed as simple "whole" notes (i.e., as simple open circles, sometimes shaded or "greyed") so as to provide an area which can be colored in by the child, although the coloring can be performed on a conventionally printed score having black and white notes.

In the embodiment which is illustrated, the colors which are associated with the notes of the scale are as follows: "C"—red, "D"—brown, "E"—yellow, "F"—purple, "G"—green, "A"—orange, "B"—blue. It will be understood that any series of easily distinguished colors can be used in addition to or in place of the foregoing, however the colors provided in this example have the very real advantage of corresponding to the colors which are provided in a child's basic crayon set.

The second symbolization level is indicated by the numeral 20 in FIG. 1A, which involves associating a distinctive edible object 22 with each of the notes of the scale, on the basis of the natural color of the object and also the first letter of its name. For example, the note middle "C", which was previously colored red, is associated with the image of a crab apple 22c; the child actually associates apples with the color red, and crab apples in particular with a biting, sour taste, the latter being useful for subsequently establishing the personality of the associated cartoon character. Continuing up the scale, the note "D" which was colored brown, is associated with a brown donut 22d, the note "E" is associated with a yellow Easter egg 22e, the note "F" with a purple fruit 22f, the note "G" with green grapes 22g (see FIG. 1B), the note "A" with orange-colored apricots 22a, the note "B" with blue blueberries 22b and, finally, upper "C" with a red cherry 22c', the sweet taste of the latter naturally contrasting with the sour of crab apples to distinguish this from middle "C". Thus, the noun name for each of the symbols 22c—22c' begins with the same letter in the alphabet as the letter designation given to the associated musical note; moreover, the association is strengthened by that fact that the child will generally know at a very early stage that the colors of these objects will naturally correspond to those which were used in the color code for the notes.

As was noted above, the exemplary symbols 22 which are employed for the second symbolization level 20 in the illustrated embodiment are all edible and have distinctive flavors. Hence, these bring the child's sense of taste into play, in addition to the sense of sight which was previously engaged by the color associations. In fact, it may be preferred in some embodiments to have the child taste a sample of each of the edible objects as the association is made, therefore reinforcing the recognition of the distinctive character of each object in the set. Other series of symbols may be associated with the musical notes at this stage, in addition to or in place of the edible objects shown, but it is generally preferable that whatever set is selected, it bring the new sense into play, in addition to sight and sound (i.e., phonetics). It should also be noted that it is preferable to employ objects which have the advantage of being shaped so as to be easily drawn by the child, as is the case with the examples 22c—22c' shown in FIGS. 1A–1B.

The final level of symbolization, as indicated by numeral 30 in FIGS. 1A–1B, involves establishing the connection between the object representing each musical note and the corresponding cartoon character. For example, FIG. 1A shows the cartoon character "Crabby Crab apple" 32c associated with the crab apple 22c which in turn represents the note middle "C". This link is established by the common color of the character, the object and note (e.g., the color red), and this may be achieved by having the child color the character with the appropriate crayon.

In addition to the use of a common color, the link between the cartoon character 32 and its associated inanimate object 22 is established by using the shape of the latter to form a significant portion of the body or other characteristic of the cartoon character. For example, it will be observed that the head of the character Crabby Crab apple 32c is formed in the shape of a crab apple 34c which corresponds in shape to the crab apple 22c. Similarly, the bodies of the other cartoon characters 32d—32c' incorporate their respective objects 22d—22c' as a prominent portion thereof. Moreover, each cartoon character preferably displays the letter of the note with which it is associated, and is depicted as carrying or embodying the image of the musical note itself to reinforce this connection.

Therefore, the shared color, shape, and first letter of the name makes it very easy for the child to associate each cartoon character with its respective object 22, and therefore with the note of the scale which each object represents.

As noted above, it is important that each of the cartoon characters 32c—32c' be endowed with personality traits which are easily distinguishable from those of the other characters. Moreover, it is preferable to somehow tie this character in with the distinguishing sensory characteristic of the object 22 which is linked to the musical note. For example, in FIG. 1A, the facial expression and other visible features of the character Crabby Crab apple are selected to endow that character with a sour disposition which is easily associated by the child with the sharp, sour taste of the crab apple 22c. So as to provide a contrast, the note upper "C" is represented by the cartoon character Cheerful Cherry, whose pleasant disposition corresponds to the sweet, pleasant flavor which the child associates with cherries 22c'. Although the link between the personality of the cartoon character and the flavor of its associated fruit or other edible object 22 may not always be as easy to grasp as in these two examples, it is nevertheless generally possible to craft each character to have a personality which can be linked (with a little imagination) to an emotional response or reaction which the child can reasonably be expected to have to the flavor or some other characteristic of the linking object 22.

Having provided the cartoon characters 32 with distinct personalities, the child and/or teacher is then able to use these characters in both educational introduction/instruction and relatively high level, second-order symbolization, in the form of storytelling, games, puppet shows, individual play, and similar activities. When working with printed materials, it is therefore preferable that each of the cartoon character images be provided with a suitable border, as indicated by dotted lines 36, so that the child can cut the character out and use it in puppet shows or other activities. In particular, if the cartoon FIG. 32 is cut from paper, as is illustrated in FIG. 2, a small paper loop 38 or similar structure may be attached to the back surface of the character to receive one or more of the child's fingers so as to enable the child to use the character as a finger puppet in puppet shows and other animated storytelling. In addition to the paper structure which is illustrated, the cartoon character may be formed of any suitable material, such as cloth or plastic, for example, and may be formed as any other kind of puppet, such as a hand or paper bag puppet mitten, or as a doll, figurine, nesting doll, toy or any other similar device which is suitable for manipulation and animation by a child and/or teacher.

Moreover, the puppet character is preferably provided with a tonal device 40. Suitably, this may be a battery powered electronic device which emits a tone, sentence, or song in response to the application of finger pressure, in a tone which corresponds to that of the musical note with which the character is associated; such devices are commonly available from a number of sources, including for example, Darice Inc. of Strongsville, Ohio. The tonal button 40, may suitably be mounted in the area indicated by the dotted line image of 42 on the front surface of the paper opposite the finger loop or band 38, with the pressure-sensitive switch portion 44 of the device facing outwardly. Thus, the person can selectively activate the tonal device by pressing it between his fingers, with his thumb on the switch portion 44, as he moves the puppet about to engage in a dialog or other introductory or storytelling activity. Thus, as the tonal device is activated (which may serve to provide "speech" for the cartoon character), the sound of the note which is associated with this character is reinforced upon the mind of the child. Moreover, this activity exercises and enhances the child's auditory perception and discrimination abilities.

The next step in the practice of the present invention is to apply the knowledge which the child has acquired through the symbolization process described above in the reading of an actual musical score 50. The musical notes 52 are provided with circular portions 54 which contain the letter designation 56 of each note. The circular portion of each note (which may be shaded or "greyed" to denote a black note) is intended to be colored in by the child using a crayon, a legend 58 showing the object images and colors which are associated with each note in the system being provided to refresh the child's memory.

Having thus filled in the colors on the notes, the child will ordinarily be able to recall, from having been motivated and socialized by playing with the puppets incorporating the tonal devices, the actual musical tone which each note represents. The child will then be able to sing or otherwise play the melody from the score 50, including any words (not shown) which may be provided.

If it is desired to instruct the child in the use of the piano keyboard or other instrument, the following additional steps may be employed. Firstly, prior to the step of introducing the child to the materials described above, colored markers, preferably adhesive plastic or paper letters corresponding to the notes of the scale, are placed on the keys in accordance with the predetermined color pattern; for example, in the embodiment which has been described above, a red letter "C" would be placed on the "C" key, a brown letter "D" on the "D" key, and so forth; as this is done, the teacher can strike each key, introducing the child to the concept that the object will be for the child to be able to produce these tones in the desired manner.

Then, following completion of the association, symbolization, and other steps described above, or possibly simultaneously therewith, the teacher can return to the keyboard and again strike each key, pointing out the color and making the association with the appropriate cartoon character; for example, the teacher may strike the red "C" key and ask the child: "Is this the sound Crabby Crab apple makes?", drawing the connection not only with the color of the character, but with the tone which it emits as well. The association is further reinforced by the use of the letter itself on the key, remembering that (as described above) it is preferable for the cartoon character to be depicted as carrying or otherwise incorporating the letter of the note which it represents.

Using this method, it has been found that children very quickly come to associate the keys with the various cartoon characters and their respective colors. As a result, the children are not only able to play the scores which they have colored in (as described above), but can in fact engage in very basic composition, by coloring notes where they have come to recognize they should be, and then using the keys having the appropriate color. Ultimately, with further practice, the child becomes able to read and play an ordinary printed (i.e., black-and-white) score without making separate reference to either the color code or the cartoon characters.

As was noted above, the system of the present invention in its preferred embodiment provides a method of instruction which is developmentally appropriate for normal children about 2–5 years old; in other words, the system takes advantage of and exercises the faculties which children usually begin to develop at this age. It should be recognized, however, that the system of the present invention represents a valuable instructional tool which can be used with both younger, developmentally advanced children and older, developmentally impaired persons as well.

Moreover, some or all of the elements described above can be adapted for use by infants, as in the form of mobiles, cloth toys, and other articles which can be used while the child is still in the crib. None of the known prior devices or systems has been adaptable for use by infants, even though it is now understood that socialization of the child begins very early in infancy. The present invention thus fills a gap in the known spectrum of instructional aids for use with infants and very young children, permitting the early socialization of the child in the area of music, in addition to the numerical and alphabetical skills which have traditionally been the focus of early childhood instruction; music can thus be efficiently integrated into curricula on the same level as other academic skills, without having to be dealt with as a separate and subordinate area of instruction. It is also important to note that the various exercises involved in the practice of the system of the present invention, as described above, intentionally involve and help develop virtually all of the child's basic skills: hand-eye coordination, language development and vocabulary (e.g., in storytelling), writing and reading skills, and so forth.

It will be recognized that the system of the present invention is applicable to the instruction of all forms of musical notation, including, for example, the treble and base clefs (to be associated with relatively higher and lower tones, for example, as opposed to the tone of any particular note), half-, quarter- and eighth-notes, etc., "families" of notes (e.g., high-, middle-, and low-"C") which may be represented by groups of cartoon characters having some shared characteristic or feature, and so forth.

Having described the present invention in its preferred embodiment, it should be understood that numerous changes and modifications may be made without departing from the spirit thereof. For example, the system of the present invention and/or the cartoon characters may be used in various forms of game play. Moreover, the cartoon characters and linking objects may be displayed on toys and other articles which are commonly used by children or teachers, including the following examples: crib toys, mobiles, cups and quilts incorporating tonal devices, puzzles, fabric designs, pins, buttons, candy, color forms, wall designs, cookie cutters, play dough forms, night lights, stickers, lamps, coloring books, and so forth, as well as in or in association with storybooks, textbooks, skill sheets, poems, video/audio cassettes, records, plays, television scripts, and computer programs. Therefore, it is to be understood that the present invention is not to be limited except as by the appended claims.

What is claimed is:

1. A method for teaching musical notation to a child, said method comprising the steps of:

coloring each of a plurality of musical notes with a separate, distinctly identifiable color, so that said child associates said musical note with said distinctly identifiable color;

matching each said distinctly identifiable color with a physical object which is selected from a group of objects with which said child has experience and which has a color in its natural condition which is substantially similar to said distinctly identifiable color, so that said child associates said musical note with said physical object; and presenting a cartoon character which prominently incorporates an image of said physical object, so that said child associates said musical note with said cartoon character which incorporates an image of said physical object.

2. The method of claim 1, further comprising the step of:

providing each of said characters with a distinctively identifiable personality characteristic.

3. The method of claim 2, wherein the step of matching each said color with an object having said color which is substantially similar to said distinctly identifiable color comprises the step of:

matching each said color with a said object which has a noun name which begins with a letter which is the same as the letter designation of said note with which said color is matched.

4. The method of claim 3, wherein the step of presenting a cartoon character which incorporates an image of said physical object comprises the step of:

presenting a cartoon character having a name which begins with a letter which is the same as said letter which begins said noun name of said physical object and said letter designation of said musical note.

5. The method of claim 4, wherein the step of presenting said cartoon character further comprises:

forming said cartoon character as a puppet for manual operation by said child.

6. The method of claim 5, further comprising the step of:

employing said manually operable puppet in an educational activity involving said cartoon character.

7. The method of claim 6, wherein the step of forming said cartoon character further comprises the step of:

providing said puppet with a tonal device which is configured for selective actuation by said child as said puppet is employed in said educational activity.

8. The method of claim 7, wherein the step of providing said puppet with said tonal device comprises the step of:

providing said puppet device with a tonal device which is configured to a tone which matches said musical note in response to actuation of said device by said child.

9. The method of claim 8, wherein the step of providing said puppet with said tonal device comprises the step of:

providing a tonal device which is configured for selective actuation in response to finger pressure applied thereto by said child.

10. The method of claim 9, wherein the step of providing said puppet with said tonal device further comprises the step of:

mounting said tonal device to said puppet so that said tonal device is positioned to be pressed between the fingers of a hand of said child while said child is holding said puppet.

11. The method of claim 4, wherein the step of matching each said color with a physical object which said child has experience further comprises the step of:

selecting a set of said physical objects which in common stimulate at least a selected one of said child's senses, each said object providing said child with a stimulus which is distinctly identifiable in character.

12. The method of claim 11, wherein the step of providing said set of objects comprises:

providing a set of edible objects with which said child has experience and which each stimulate said child's sense of taste.

13. The method of claim 11, wherein the step of providing said cartoon characters with distinctly identifiable personality characteristics comprises the step of:

correlating said distinctly identifiable personality characteristics of each said cartoon character with an anticipated emotional response of said child to said distinctly identifiable stimulus which is provided by said object with which said character is associated.

14. The method of claim 1, wherein the step of forming each said cartoon character to prominently incorporate said image of said object with which said character is associated comprises the step of:

incorporating said image of said object as a prominent portion of a body of said character.

* * * * *